United States Patent
Barth et al.

(10) Patent No.: US 8,452,999 B2
(45) Date of Patent: May 28, 2013

(54) PERFORMANCE ESTIMATION FOR ADJUSTING PROCESSOR PARAMETER TO EXECUTE A TASK TAKING ACCOUNT OF RESOURCE AVAILABLE TASK INACTIVE PERIOD

(75) Inventors: Andy Barth, Aston Clinton (GB); Daniele Dall'Acqua, Aylesbury (GB); Nigel Drew, Calne (GB)

(73) Assignee: Freescale Semiconductor, Inc., Austin, TX (US)

( * ) Notice: Subject to any disclaimer, the term of this patent is extended or adjusted under 35 U.S.C. 154(b) by 403 days.

(21) Appl. No.: 12/810,172

(22) PCT Filed: Dec. 28, 2007

(86) PCT No.: PCT/IB2007/055333
§ 371 (c)(1),
(2), (4) Date: Jun. 23, 2010

(87) PCT Pub. No.: WO2009/083753
PCT Pub. Date: Jul. 9, 2009

(65) Prior Publication Data
US 2010/0287396 A1    Nov. 11, 2010

(51) Int. Cl.
*G06F 1/32*    (2006.01)
(52) U.S. Cl.
USPC .......................................... 713/322; 718/107
(58) Field of Classification Search
None
See application file for complete search history.

(56) References Cited

U.S. PATENT DOCUMENTS

| 7,194,385 | B2 * | 3/2007 | Flautner et al. | 702/186 |
| 7,464,379 | B2 | 12/2008 | Kanai | |
| 2002/0194509 | A1 | 12/2002 | Plante et al. | |
| 2003/0233592 | A1 | 12/2003 | Lin et al. | |
| 2008/0147357 | A1 * | 6/2008 | Truter | 702/186 |

FOREIGN PATENT DOCUMENTS

WO    2004/044720 A    5/2004

OTHER PUBLICATIONS

"Dynamic Power Management by Clock Speed Variation" IBM Technical Disclosure Bulletin, IBM Corp. New York, US, vol. 32, No. 8B, Jan. 1, 1990.
International Search Report and Written Opinion correlating to PCT/IB2007/055333 dated Oct. 7, 2008.

\* cited by examiner

*Primary Examiner* — Kenneth Kim

(57) ABSTRACT

A method of processing data using a data processor having an operating system for performing tasks of an application program, and a power and performance controller controlling parameters and modes of execution of the tasks by the data processor. The power and performance controller includes a performance predictor producing an estimation of required performance of the data processor for the tasks taking account of inactive periods of the tasks and adjusting the performance and power consumption of the data processor in response to the estimation. The performance predictor distinguishes for each of the tasks between: —available inactive periods of the task during which the operating system is available to continue to process the same task, and—unavailable inactive periods of the task during which the operating system is not available to continue to process the same task. A substantial improvement is obtained in quality of service, with fewer missed deadlines in performance of the tasks.

20 Claims, 4 Drawing Sheets

PERFORMANCE ESTIMATION FOR ADJUSTING PROCESSOR PARAMETER TO EXECUTE A TASK TAKING ACCOUNT OF RESOURCE AVAILABLE TASK INACTIVE PERIOD

FIELD OF THE INVENTION

This invention relates to a data processing apparatus, a method for processing data and a computer program product.

BACKGROUND OF THE INVENTION

Power saving is a constant preoccupation, especially in portable devices with an internal source of energy, such as a rechargeable battery. Power consumption of a data processor is broadly classified as dynamic power while the processor is operating (for example with component circuits switching), and static power while it is not operating but still powered (for example non-switching steady state or transistor-off state). Static or leakage power dissipation also occurs when a circuit is operating, although for today's technologies this is small compared to the dynamic power dissipation.

Various power-saving technologies have been developed to address sources of power waste. Many are all-hardware solutions such as smaller silicon process geometries, active well biasing and auto-idle detection circuits. Other technologies address the compromise between the operating parameters of the data processor on one hand and power consumption on the other hand. One such technique is known generically under the name of Dynamic power management (DPM), which describes a system that sets the power states of its hardware modules in real time to minimize power waste, with the minimum performance needed still to meet operational requirements. DPM includes techniques such as dynamic voltage and frequency scaling (DVFS) and dynamic process and temperature compensation (DPTC) for dynamically controlling operational modes, and idle time prediction for controlling low-power idle modes (such as doze, where the processor is powered but not clocked, and sleep, where some modules of the processor are not supplied with operational power).

These techniques will now be reviewed in more detail. Application programs and other system software are monitored during execution in the data processor. Some of these applications can identify their coming performance-power needs ("power aware" software) but many others cannot. Awareness of coming performance-power needs can be used to control a power manager that drives the hardware power-saving mechanisms using software drivers and power handlers in the data processor operating system.

One dynamic power saving technique is to slow or disable the clock to a logic circuit when the circuit is idling. Clock gating or clock freezing saves power not just in the registers whose clock is gated off, but also in combinational logic circuits connected to them, as the register signals are no longer propagated. Clock gating is very quick to turn on and off, so software that uses such circuits should not be affected if it is timed correctly. Static or leakage power dissipation needs more drastic measures. One solution, called power gating, is to power off the device or subcomponent. Power gating reduces both dynamic and leakage power, and can be implemented either locally on-chip or externally at the power supply unit.

Another power-saving technique is to vary the supply voltage to a circuit either when no performance is required (idling) or when variable performance is required. During idling mode the hardware can switch automatically from a higher to a lower voltage when the device or subcomponent transitions from an active state to a low-performance state. An example is a processor core design where operating voltage is reduced automatically when it enters a sleep or stop mode. Although the core is not clocked in this mode, it still suffers steady-state current leakage. Because the core does not need to execute instructions or other functions, the operating voltage can be lowered to a value just sufficient to ensure that internal state data is retained correctly. This is sometimes called stop mode voltage scaling.

The non-idling situation, where variable performance is needed, is addressed by varying the operating frequency, the operating voltage, or both. Dynamic Frequency Scaling relies on the observation that dynamic power consumption in an integrated circuit is roughly proportional to operating frequency. It makes sense, therefore, to lower the clock frequency of a processor to the lowest value that still meets the required processing performance. This means that although the software runs more slowly, it still meets its real-time deadlines with acceptable margins. This is done dynamically and needs power management software adapted to decide which frequency setting is acceptable. Better power savings can be achieved if the operating voltage is also scaled. Since power varies with the square of voltage, square-law power savings potentially are possible with voltage scaling. If voltage scaling and frequency scaling are both used, the combination, called dynamic voltage and frequency scaling (DVFS), can yield power savings roughly proportional to the cube of operating voltage.

These square-law and cube-law power savings depend not only on the configuration and efficiency of the voltage control circuits, but also on the efficiency of prediction software used to set the voltage/frequency settings. For a given integrated circuit design, the operating voltage determines the maximum usable operating frequency. The voltage (and hence frequency) are scaled to trade required performance against minimal power waste. When scaling the voltage up or down (thereby consuming more or less power), the operating frequency is also scaled, and with it the available performance of the device, which is to be controlled to remain within the operational tolerance of the design. DVFS technology addresses varying but continuing software workloads.

Performance-prediction and performance-setting algorithms are available to control the performance-power states of the system hardware such as the processor speed-voltage levels dynamically, both for run modes and for idle modes. Algorithms exist for use with DVFS-based processors that set the processor's operating frequency and voltage based on predicting the short-term software workload on the processor. An example algorithm in this class tracks the history of the recent software workload of each task (that is to say a set of program instructions that is loaded in memory) running in the OS and extrapolates it to derive a prediction of required performance in the next coming period. This technique assumes a reasonable correlation between the recent past workload of a task and that of the near future. The task status information is supplied by the OS kernel. The algorithm maintains estimates of workload and unused idling time to predict the aggregate workload (for all tasks). This normalized MCU processing level is translated by associated software into the relevant frequency and voltage settings required for the specific DVFS mechanism used. The algorithm continuously re-calculates and supplies new predictions in response to changing software workloads. In principle, the algorithm predicts the required processor performance that just meets individual deadlines for each OS task. The algorithm works reasonably well for OS tasks whose workloads don't change very rapidly.

The actual performances and power savings achieved by this kind of algorithm have been disappointing compared to theoretical calculations and prototype simulations. It is an object of the present invention to improve the achievable performances and power savings of a data processor.

SUMMARY OF THE INVENTION

The present invention provides a data processing apparatus, a data processing method and a computer programme for performing the data processing method as described in the accompanying claims.

DETAILED DESCRIPTION OF THE PREFERRED EMBODIMENTS

Figure 1:
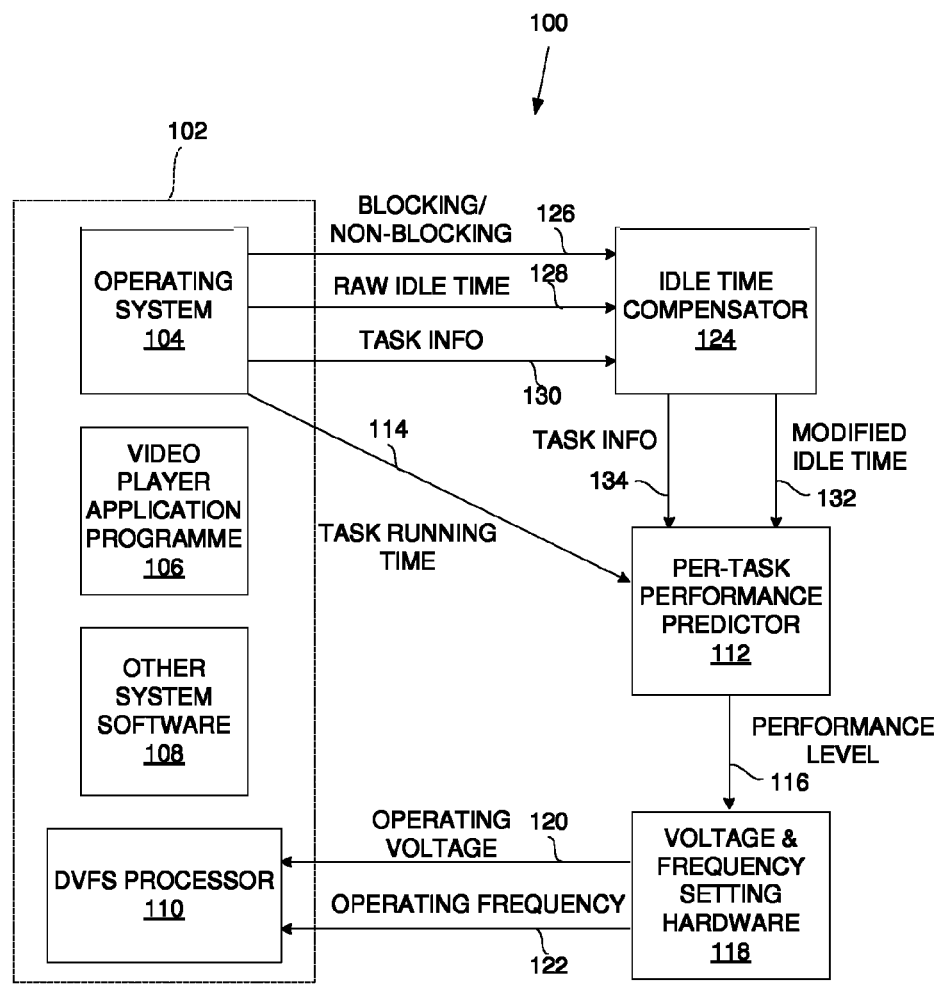
FIG. 1 is a schematic diagram of an example of a data processing apparatus employing a dynamic voltage and frequency scaling ('DVFS') process in accordance with one embodiment of the invention, given by way of example.

FIG. 1 of the drawings shows a data processing apparatus 100 employing a dynamic voltage and frequency scaling ('DVFS') process in accordance with one embodiment of the invention, given by way of example. In this example, the invention is illustrated as applied to a video player application but it will be appreciated that the invention is applicable to many other applications.

The apparatus 100 comprises an central processor unit ('CPU') 102 including an operating system ('OS') 104, a video player application programme 106, other system software 108 for performing other applications and a DVFS processor 110 for setting the processor's operating frequency and voltage based on predictions of the short-term software workload on the CPU 102.

The apparatus also includes a performance predictor 112 for predicting the performance required for each task to be completed before critical deadlines, the performance predictor receiving an input 114 from the OS 104 regarding the task running times of the video player application programme. The performance predictor 112 produces a performance level output signal 116 for each task, which it provides to DVFS hardware 118. The DVFS hardware 118 supplies signals 120 and 122 defining the selected voltage and clock frequency levels that the DVFS processor 110 applies to the CPU for each task.

The performance predictor 112 predicts the short-term software workload on the CPU for each task using an algorithm which tracks the history of the recent software workload of each task running in the OS and extrapolates it to derive a prediction of required performance in the next coming period. In this embodiment of the present invention, the performance predictor 112 is arranged to distinguish between blocking and non-blocking operating system access calls.

Input and output operations in data processing apparatus can be extremely slow compared to the processing of data. For example, during a fetch operation that takes ten milliseconds to perform, a processor that is clocked at one gigahertz could have performed ten million instruction-processing cycles.

A simple approach to input and output operations ('I/O') for a task 'A' is to start the access and then wait for it to complete before processing task A or even other tasks. Such an approach (called synchronous I/O or blocking I/O) is necessary for certain types of I/O but blocks the progress of a program while the I/O is in progress, leaving system resources idle. When a program makes many I/O operations, this means that the processor can spend almost all of its time idle waiting for I/O operations to complete.

For some processing tasks, it is possible to start the I/O for a task A and then perform processing that does not require that the I/O has completed, in particular processing of other tasks. For these other tasks, the I/O is asynchronous or non-blocking I/O. Any task, such as the task A that actually depends on the I/O having completed (this includes both using the input values and critical operations that need to assure that a write operation has been completed) still has to wait for the I/O operation to complete, and thus is still blocked, but other processing tasks which do not have a dependency on the I/O operation can continue.

Asynchronous input/output, or non-blocking input/output of a task 'A', is a form of input/output processing that permits the operating system to process other tasks before the input/output transmission has finished, although task A itself has to wait for the completion of the I/O. On the other hand, a call by the application on the OS resources (the CPU) for task A can block the OS even for performance of other tasks during the period of a non-blocking I/O call unless the call also forces the application to release the OS for the other tasks, in which case task A itself is then blocked by lack of OS resource.

Taking account of idle periods to calculate the required processor performance enables the DVFS controller to adjust the performance so that it is just sufficient to meet deadlines and other requirements. The performance predictor 112 in the embodiment of the present invention shown in FIG. 1 is arranged to distinguish for a given task A between: — inactive periods relating to a non-blocking operating system access call where tasks other than task A can continue to be processed while the OS call is interrupted, at least during a waiting period where the task A requires completion of I/O access, for example, and a blocking operating system access call where the task A does not release the OS during a waiting period where the task A requires completion of I/O access and no tasks can be processed after the call until completion of the operating system access.

The power and performance controller function of the apparatus of FIG. 1 includes an idle time compensator which modifies the idle time calculation of the performance predictor 112 for each task to make a distinction between inactive periods of that task where operating system access was available ('unblocked') to that task and therefore denied to other tasks, on one hand, and inactive periods of that task where operating system access was unavailable ('blocked') to that task and therefore available to other tasks. For the inactive periods of task A, where the CPU was inactive but dedicated to task A, and therefore blocked for other tasks, the CPU could have run slower during its active period of processing task A and use part of the inactive period that otherwise idles.

On the contrary, for the inactive periods of task A, where the CPU was inactive but blocked by other tasks and therefore unavailable to task A, it is erroneous to assume that the CPU could have run slower during its active period, since the CPU could not have run slower during its active period in order to use part of the inactive period for task A anyway. Conversely, for the inactive periods that are blocked to task A, if the CPU 102 did not process any other tasks while it was available for those other tasks, the waiting period of each of those other tasks can correctly be taken into account for the other tasks (but not for task A) when calculating possible performance reduction and power consumption savings.

Specifically, the idle time compensator 124 receives signals 126, 128 and 130 from the OS 104 identifying respectively whether an OS access call of the current application task is blocking or non-blocking for use of the CPU for other tasks, the uncorrected ('raw') idle time associated with the current task and other information relative to the current task. The idle time compensator 124 then subtracts from the raw idle time for each task 134 any inactive time during which the CPU was anyway unavailable to perform that same task and provides to the performance predictor 112 outputs 132 defining the idle time calculation thus modified for each task identified at 134.

In more detail, in this example of an embodiment of the present invention, the performance estimate is derived using the following steps. It will be appreciated that other algorithms could be used to implement such embodiments of the invention.

First, the full-speed equivalent workload $Work_{fse}$ of the task during a succession of timeslots i=1 to N during a recent past period (for example 100 ms, depending on the OS) is calculated using the equation $$Work_{fse} = \sum_{i=1}^{N} t_i \times p_i$$

where $t_i$ is the length of the time slot i and $p_i$ is the CPU performance rate during the time slot.

Next, a decaying average of workload over a longer period is calculated using the following equation:

$$WorkEst_{new} = \frac{k \times WorkEst_{old} + Work_{fse}}{k+1}$$

where k is a weighting factor.

Then, a decaying average of the time to go to the required deadline is calculated using the following equation:

$$Deadline_{new} = \frac{k \times Deadline_{old} + Work_{fse} + Idle_{fse}}{k+1}$$

where $Idle_{fse}$ is the idle time for the task compensated by subtracting idle time for which the CPU was unavailable for that task.

Lastly, the adjustment in percentage of the performance required just to meet the calculated deadline time is calculated using the following equation:

$$Perf_{task} = \frac{WorkEst_{task}}{Deadline_{task}}.$$

Figure 2:
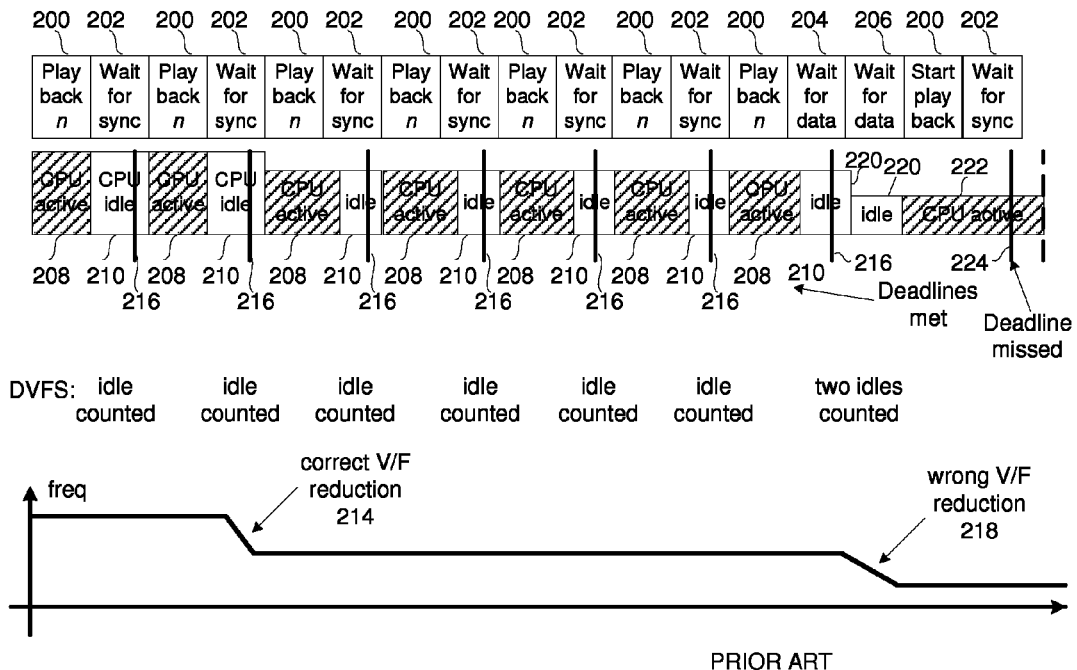
FIG. 2 is an example of a timing diagram of performance prediction in a known DVFS process.
Figure 3:
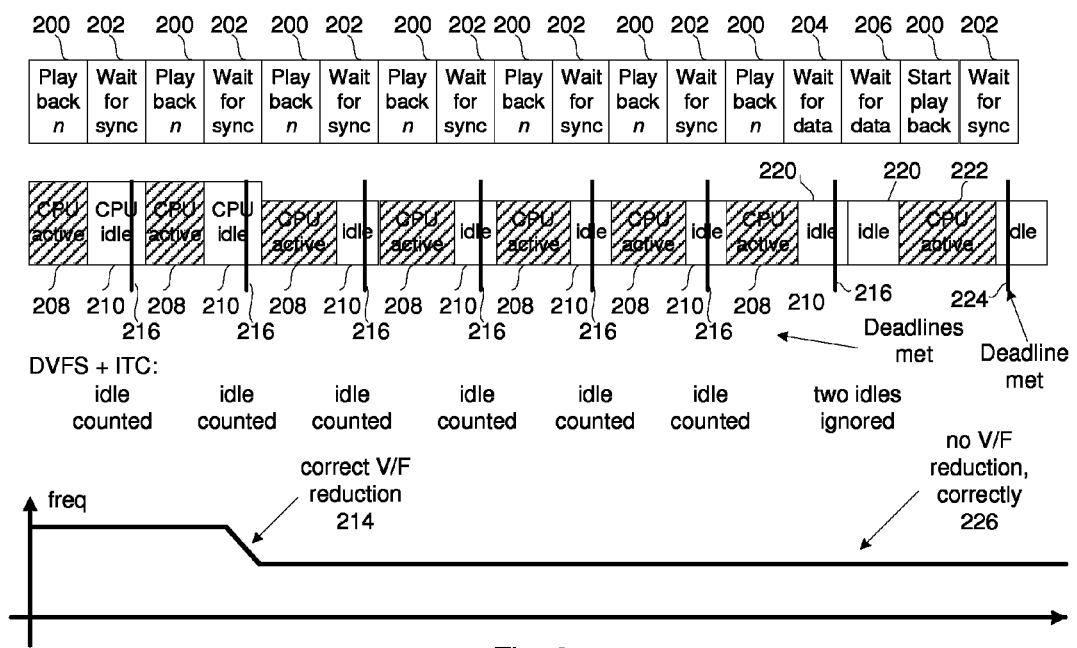
FIG. 3 is an example of a timing diagram of performance prediction in a DVFS process in the data processing apparatus of FIG. 1.

An illustration of the effect of the idle time compensator 124 is shown in FIG. 2, which shows the functioning of a DVFS system without the idle time compensator 124 and FIG. 3, with the idle time compensator 124.

In FIGS. 2 and 3, the video application programme is shown as requiring frames of n time slots 200 to be played back from an input buffer (not shown) for a task A. Each frame is followed by a slot 202 in which the processing of the frames waits for a synchronisation signal and the CPU can be inactive. In the example shown in the drawings, no other task than task A calls for servicing by the OS. However, during the wait for a synchronisation signal, the OS would be available to perform tasks other than task A provided the other tasks are completed by the CPU sufficiently before the next slot 200 where the next synchronisation signal for task A requires processing in the CPU.

CPU 102 alternates between active periods 208 and inactive periods 210 in which the current task is completed and the CPU is put to idle if no other task calls for servicing by the OS. The processing of video frames by the video application program 104 continues in this fashion until the input buffer is empty. During subsequent inactive periods 204 and 206, the video application program makes a system call to the OS requesting a fetch of new frame data that is not already in the local input buffer, and the OS is unavailable to process the task A whilst the I/O interface (for example a network driver or disk driver) fetches the data from the input into the buffer. This deferred completion is an asynchronous operation in that sense. The OS 104 returns control to the calling video program which completes its work on the current frame then yields control to the OS at the end of slot 200. Slot 200 corresponds to the DVFS Processor 110 being active (e.g. in Run mode). The task A cannot use the CPU during the inactive periods 204 and 206, where the OS is unavailable to process data for task A. The task A can resume as soon as data is available in the buffer provided no other task has blocked the CPU in the meantime.

The action of the performance controller, including the performance predictor 112, the voltage and frequency setting hardware 118 and the DVFS processor 110 in the absence of the idle time compensator 124 is illustrated in FIG. 2. As shown by the graph 212 of frequency (and/or supply voltage) against time, initially the CPU runs at normal speed, with full clock frequency. After two inactive periods 210, the calculation of performance required leads the performance controller to slow the CPU 102, as shown at 214, so that the active period of the CPU runs at slower speed for a longer time, with corresponding energy saving, reducing the duration of the idle period. The active periods of the task A are still completed satisfactorily before the slot deadlines, shown at 216.

However, when the input buffer is empty, and the process calls for a fetch of further data from the input into the buffer at 204 and 206, the performance controller again reduces the speed of the CPU performance, as shown at 218, since all the OS inactive periods of the current task A are taken into account in calculating the performance required, including the idle periods 220 during which the CPU could not process task A while data is being fetched into the buffer. In fact, the performance controller underestimates the performance required for timely completion of the task once data is available for the task to start again. When the data is available and the CPU 102 resumes an active slot at 222, the duration of the active period is prolonged too much and the deadline 224 for completing the active period is overshot. In practice, it is found that such missing of deadlines leads to sub-optimal behaviour of the system and in particular to lack of stability and inaccurate prediction. This results in degraded quality of service such as, in a video player application, missed video frames, for example. Such sub-optimal behaviour is not apparent from typical modelling of the process in relatively stable workload conditions nor from simple non-OS testing of the workload and performance predictor.

Turning now to FIG. 3, which shows the functioning of the DVFS system with the idle time compensator 124, similar elements are indicated by the same reference numbers as in FIG. 2. The same reduction of speed of the CPU performance occurs at 214, due to the blocking idle periods 202. However the idle time compensator 124 corrects the raw idle time indication 128, so that the modified idle time indication now ignores the idle times 220 which are unavailable to task A. As a result, the performance controller correctly does not make a further reduction in speed of the CPU 102 at 226 in response to the idle periods 220 and the CPU runs at unchanged speed during the following active period 228, so that it is completed before the deadline 224. In actual usage of the CPU with such practical applications, it is found that a substantial improvement is obtained in avoiding missed deadlines, so that the system stability and quality of service are greatly improved in practical usage cases, even though modelling and testing do not necessarily reveal the improvement.

Figure 4:
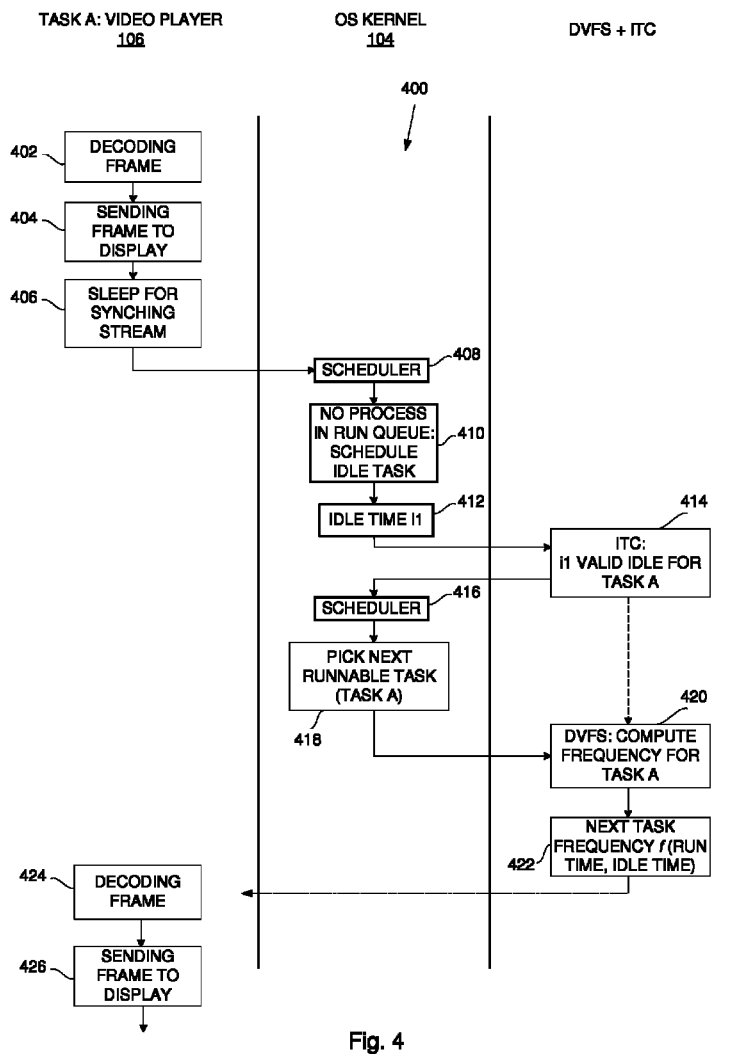
FIG. 4 is a flow chart of the DVFS process of FIG. 3 for a first task.
Figure 5:
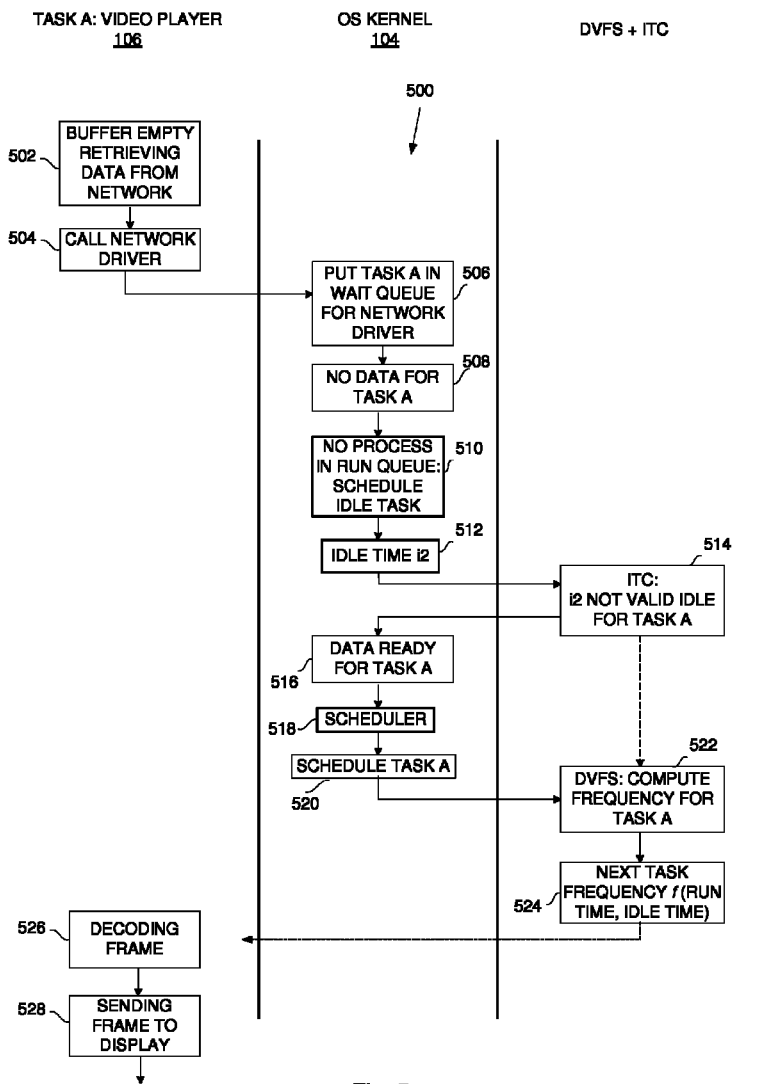
FIG. 5 is a flow chart of the DVFS process of FIG. 3 for a second task

FIGS. 4 and 5 illustrate an example of the sequencing of process steps between the video player programme 106, the kernel of the OS 104 and the performance controller modules including the DVFS processor 110, the performance predictor 112, the DVFS hardware 118 and the idle time compensator 124. FIG. 4 shows the process in the case of a valid voltage/frequency calculation as shown at 214 in FIGS. 2 and 3 and at 226 in FIG. 3, and FIG. 5 shows the process in the case of an invalid voltage/frequency calculation as shown at 218 in FIG. 2.

Referring first to FIG. 4, the process 400 illustrated starts with decoding a frame at 402 and sending the decoded frame to the display at 404, corresponding to the playback n steps 200 of FIGS. 2 and 3. At the end of the frame, the video player application then sleeps waiting for a synching stream at 406. A scheduler in the OS kernel 104 responds at 408 to the video player application sleeping by noting the absence of a process to run in the run queue and at 410 schedules an idle period, economising consumption of energy, corresponding to the idle steps 202 of FIGS. 2 and 3. The idle time i1 is identified at 412 and sent to the idle time compensator 124. The idle time compensator 124 verifies at 414 that the idle time is a time where the OS was available for processing task A, and is not a time where task A is waiting for an I/O, and sends a signal to the scheduler in the OS kernel 104 at 416. In this embodiment of the invention, the idle time compensator takes account of the reason why the period is inactive when distinguishing between available inactive periods where the OS was available for the current task A and unavailable inactive periods where it was not.

The scheduler picks the next runnable task at 418 and identifies this task to the performance predictor 112 through the idle time compensator 124. The performance predictor 112 computes the appropriate frequency/voltage for that task at 420, including information about idle period i1 from step 414 into the decaying average idle time accumulator for the tasks, and defines the corresponding task run time and idle time at 422. The video player application can then instruct the OS to start decoding the next frame at 424 and sending the decoded frame to the display at 426.

In the process shown in FIG. 5, the process illustrated starts with the video player application 106 arriving at a state 502 where it has finished processing all frames from its input buffer, which is empty and the player has to call the network driver to fetch new frames, corresponding to the end of the playback step before the waiting steps 204 and 206 of FIGS. 2 and 3. The OS kernel 104 responds to this situation at 506 by putting the task A into a wait queue for the network driver. At 508, in this example, the OS kernel 104 has no other tasks to run at this point in time and schedules an idle period i2 for the CPU at 510, economising consumption of energy, corresponding to the idle steps 204 and 206 of FIGS. 2 and 3. The idle time i2 would be exploitable for other tasks but the OS is unavailable for task A, whether or not it processes other tasks. The idle time i2 is identified at 512 and sent to the idle time compensator 124. The idle time compensator 124 verifies at 514 that the idle time is available for task A and sends a signal to the scheduler in the OS kernel 104 at 516 when data is ready for task A. This triggers the scheduler at 518 to pick the next runnable task at 520 and to identify this task to the performance predictor 112 through the idle time compensator 124. The performance predictor 112 computes the appropriate frequency/voltage for task A and the other tasks at 522, eliminating idle period i2 from the decaying average idle time accumulator for task A due to the information from step 514, but including information about idle period i2 from step 514 into the decaying average idle time accumulator for the other tasks. The performance predictor 112 defines the corresponding task run time and idle time at 524 and this data is passed to the video player application, which starts decoding the next frame at 526 and sending the decoded frame to the display at 528.

The embodiments of the invention shown in the drawings are simple processes that illustrate features of the embodiments. It will be appreciated that these embodiments of the invention are applicable to advanced runtime performance algorithms and can use standardized software framework that supports multiple concurrent predictors, policies and power cost rules, for example. These embodiments of the invention can run with the system software of various commercially available operating systems

The invention claimed is:

1. Data processing apparatus comprising:
    a data processor having an operating system to perform tasks of an application program; and
    a power and performance controller to control parameters and modes of execution of said tasks by said data processor, said power and performance controller including a performance predictor to calculate an estimation of required performance of said data processor for said tasks taking account of inactive periods of said tasks, and to adjust the parameters and modes of execution of said tasks by said data processor in response to said estimation;
    said performance predictor being arranged to distinguish for each of said tasks between: —
        available inactive periods of said data processor during which said data processor was available to process a same task, said available inactive periods are included in calculating said estimation of required performance for the same task, and
        unavailable inactive periods of said data processor during which said data processor was not available to process the same task and other tasks, and unavailable active periods of said data processor during which said data processor was not available to process the same task but was processing other tasks, said unavailable inactive periods and unavailable active periods are not included in calculating said estimation of required performance for the same task.

2. Data processing apparatus as claimed in claim 1, wherein said data processor is responsive to unavailable inactive periods for a task to switch the operating system to another task if not blocked by the inactive task, or to an idle mode if no other task is ready to be processed.

3. Data processing apparatus as claimed in claim 1, wherein said power and performance controller is responsive to said available inactive periods but not to said unavailable periods for a task in calculating said estimation for that task.

4. Data processing apparatus as claimed in claim 1, wherein said tasks include input/output accesses, and said power and performance controller is responsive to said input/output accesses of a task to exclude corresponding inactive periods in calculating said estimation for that task.

5. Data processing apparatus as claimed in claim 1, wherein said power and performance controller is responsive to a decaying average of workload for a task in calculating said estimation for that task.

6. Data processing apparatus as claimed in claim 1, wherein said power and performance controller is arranged to adjust clock frequency and or supply voltage for said data processor in adjusting the performance and power consumption of said data processor in response to said estimation.

7. Data processing apparatus as claimed in claim 2, wherein said power and performance controller is responsive to said available inactive periods but not to said unavailable periods for a task in calculating said estimation for that task.

8. Data processing apparatus as claimed in claim 2, wherein said tasks include input/output accesses, and said power and performance controller is responsive to said input/output accesses of a task to exclude corresponding inactive periods in calculating said estimation for that task.

9. Data processing apparatus as claimed in claim 3, wherein said tasks include input/output accesses, and said power and performance controller is responsive to said input/output accesses of a task to exclude corresponding inactive periods in calculating said estimation for that task.

10. Data processing apparatus as claimed in claim 2, wherein said power and performance controller is responsive to a decaying average of workload for a task in calculating said estimation for that task.

11. Data processing apparatus as claimed in claim 3, wherein said power and performance controller is responsive to a decaying average of workload for a task in calculating said estimation for that task.

12. Data processing apparatus as claimed in claim 4, wherein said power and performance controller is responsive to a decaying average of workload for a task in calculating said estimation for that task.

13. Data processing apparatus as claimed in claim 2, wherein said power and performance controller is arranged to adjust clock frequency and or supply voltage for said data processor in adjusting the performance and power consumption of said data processor in response to said estimation.

14. Data processing apparatus as claimed in claim 3, wherein said power and performance controller is arranged to adjust clock frequency and or supply voltage for said data processor in adjusting the performance and power consumption of said data processor in response to said estimation.

15. A method of processing data using a data processor having an operating system for performing tasks of an application program, and a power and performance controller controlling parameters and modes of execution of said tasks by said data processor, said power and performance controller including a performance predictor; the method comprising:

calculating by said performance predictor an estimation of required performance of said data processor for said tasks taking account of inactive periods of said tasks; and adjusting by said performance predictor the performance and power consumption of said data processor in response to said estimation;

distinguishing by said performance predictor for each of said tasks between: — available inactive periods of said data processor during which said data processor is available to continue to process a same task, said available inactive periods are included in calculating said estimation of required performance for the same task, and unavailable inactive periods of said data processor during which said data processor was not available to process the same task and other tasks, and unavailable active periods of said data processor during which said data processor was not available to process the same task but was processing other tasks, said unavailable inactive periods and unavailable active periods are not included in calculating said estimation of required performance for the same task.

16. A method of processing data as claimed in claim 15, wherein said data processor is responsive to unavailable inactive periods for a task to switch the operating system to another task if not blocked by the inactive task, or to an idle mode if no other task is ready to be processed.

17. A method of processing data as claimed in claim 15, wherein said power and performance controller responds to said available inactive periods but not to said unavailable periods for a task in calculating said estimation for that task.

18. A method of processing data as claimed in claim 15, wherein said tasks include input/output accesses, and said power and performance controller responds to said input/output accesses of a task to exclude corresponding inactive periods in calculating said estimation for that task.

19. Data processing apparatus as claimed in claim 1, wherein said power and performance controller responds to a decaying average of workload for a task in calculating said estimation for that task.

20. Data processing apparatus as claimed in claim 1, wherein said power and performance controller adjusts clock frequency and or supply voltage for said data processor in adjusting the performance and power consumption of said data processor in response to said estimation.

* * * * *